US008639868B2

(12) United States Patent
Pruthi et al.

(10) Patent No.: US 8,639,868 B2
(45) Date of Patent: Jan. 28, 2014

(54) CUSTOMIZATION OF A BUS ADAPTER CARD

(75) Inventors: Arvind Pruthi, Los Gatos, CA (US); Ram Kishore Johri, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 122 days.

(21) Appl. No.: 13/181,322

(22) Filed: Jul. 12, 2011

(65) Prior Publication Data
US 2012/0017020 A1 Jan. 19, 2012

Related U.S. Application Data

(60) Provisional application No. 61/365,250, filed on Jul. 16, 2010.

(51) Int. Cl.
*G06F 13/00* (2006.01)
*G06F 13/28* (2006.01)

(52) U.S. Cl.
USPC .......................................... 710/301; 711/138

(58) Field of Classification Search
USPC .......................................... 710/301; 711/138
See application file for complete search history.

(56) References Cited

U.S. PATENT DOCUMENTS

| | | | | |
|---|---|---|---|---|
| 5,668,957 A * | 9/1997 | Davis et al. | | 710/22 |
| 5,822,616 A * | 10/1998 | Hirooka | | 710/22 |
| 6,625,676 B1 * | 9/2003 | Gold et al. | | 710/74 |
| 7,188,200 B2 * | 3/2007 | Griech | | 710/100 |
| 7,584,271 B2 * | 9/2009 | Hsu et al. | | 709/220 |
| 7,610,295 B2 * | 10/2009 | Pooni et al. | | 1/1 |
| 7,721,049 B2 * | 5/2010 | Ehrlich et al. | | 711/135 |
| 7,805,572 B2 * | 9/2010 | LeMire et al. | | 711/118 |
| 7,899,945 B2 * | 3/2011 | Haechten et al. | | 710/5 |
| 8,069,293 B1 * | 11/2011 | Rogan et al. | | 710/301 |
| 8,180,855 B2 * | 5/2012 | Aiello et al. | | 709/219 |
| 8,230,153 B2 * | 7/2012 | El Zur | | 711/4 |
| 8,473,680 B1 | 6/2013 | Pruthi | | |
| 2003/0229713 A1 * | 12/2003 | Hensbergen et al. | | 709/239 |
| 2004/0064459 A1 | 4/2004 | Pooni et al. | | |
| 2005/0055505 A1 * | 3/2005 | Day et al. | | 711/133 |

(Continued)

FOREIGN PATENT DOCUMENTS

WO 0043889 7/2000

OTHER PUBLICATIONS

Jardon, S, Authorized Officer, European Patent Office, PCT International Application No. PCT/US2011/043753, filed Jul. 12, 2011, in International Search Report, mailed Dec. 7, 2011, 11 pages.

(Continued)

*Primary Examiner* — Paul R Myers
*Assistant Examiner* — Christopher A Daley

(57) ABSTRACT

The present disclosure includes systems and techniques relating to customization of a bus adapter card. In some implementations, an apparatus includes a processor and a program memory, a bus adapter card coupled with the computing apparatus and configured to connect with a storage device, the bus adapter card comprising a cache memory and a controller to cache in the cache memory data associated with the storage device, where the program memory includes a driver to communicate with the bus adapter card responsive to requests corresponding to the storage device, and the driver is configured to modify its communications with the bus adapter card responsive to information provided separate from the requests.

20 Claims, 6 Drawing Sheets

(56) References Cited

U.S. PATENT DOCUMENTS

| | | |
|---|---|---|
| 2006/0031602 A1* | 2/2006 | Ellis et al. ................ 710/22 |
| 2006/0080579 A1* | 4/2006 | Rothman et al. ............ 714/43 |
| 2008/0147893 A1 | 6/2008 | Marripudi et al. |
| 2009/0089467 A1* | 4/2009 | Rothman et al. ........... 710/107 |
| 2010/0011198 A1 | 1/2010 | Hooker et al. |
| 2010/0115197 A1* | 5/2010 | Lee et al. ................ 711/113 |
| 2011/0208919 A1 | 8/2011 | Pruthi |
| 2012/0017020 A1* | 1/2012 | Pruthi et al. ............. 710/301 |
| 2012/0290795 A1* | 11/2012 | Dowlatkhah ............... 711/136 |

OTHER PUBLICATIONS

Pruthi, Arvind, "Caching Based on Spatial Distribution of Accesses to Data Storage Devices," U.S. Appl. No. 13/033,569, filed Feb. 23, 2011, 51 pages.

Pruthi, Arvind, "Hotspot Detection and Caching for Storage Devices," U.S. Appl. No. 12/881,459, filed Sep. 14, 2010, 39 pages.

* cited by examiner

CUSTOMIZATION OF A BUS ADAPTER CARD

CROSS REFERENCE TO RELATED APPLICATIONS

This application claims the benefit under 35 U.S.C. §119(e) of U.S. Provisional Application Ser. No. 61/365,250, entitled "Customization of Marvell Hybrid PCIe Card," filed on Jul. 16, 2010, which is incorporated herein by reference in its entirety.

BACKGROUND

This specification relates to customizing caching behavior of a bus adapter card.

Examples of storage devices include hard disk drives and optical disc drives. Storage devices typically store data in blocks on a rotating storage medium. Block sizes are often measured in kilobytes (KB). For example, the storage medium may include magnetic disks, optical discs, etc. The storage devices typically have slower access times than semiconductor memory. As a result, data can be read faster from the semiconductor memory than from the storage medium.

Many storage devices include a semiconductor memory called cache memory to store data that is repeatedly requested by a host or that may be requested by the host. Such storage devices typically include a cache controller that controls caching of data to the cache memory. For example, when the host issues a read command, the cache controller first determines if the requested data is available in the cache memory. If not, a cache miss occurs, and the data is retrieved from the storage medium and is forwarded to the host. The cache controller can cache the data in the cache memory. When the host requests the same data again, the data is found in the cache memory (i.e., a cache hit occurs) and is output to the host from the cache memory. The host receives the data faster from the cache memory than from the storage medium.

SUMMARY

The present disclosure includes systems and techniques relating to customizing caching behavior of a bus adapter card connected to a storage device.

In general, one aspect of the subject matter described in this specification can be implemented by an apparatus including a processor, a program memory, a bus adapter card coupled with the apparatus and configured to connect with a storage device, the bus adapter card comprising a cache memory and a controller to cache in the cache memory data associated with the storage device, where the program memory includes a driver to communicate with the bus adapter card responsive to requests corresponding to the storage device and the driver is configured to modify its communications with the bus adapter card responsive to information provided separate from the requests.

These and other implementations can include one or more of the following features. The program memory can be divided into a kernel space and a user space with a kernel module in the kernel space where the driver can be configured to redirect at least one request corresponding to the storage device over to the kernel module, receive from the kernel module the information comprising a directive associated with the at least one request, and communicate the directive associated with the at least one request to the bus adapter card. The directive associated with the at least one request can be based on information generated by the bus adapter card, the information including at least one of cache statistics, locality information, and hotspot information. The directive associated with the at least one request can direct the bus adapter card to perform at least one of a pre-fetch and quality of service operation. The program memory can be divided into a kernel space and a user space, with a policy engine in the user space, where the driver is configured to receive from the policy engine the information comprising a policy to modify a caching behavior of the bus adapter card. The information comprising a policy can be based, at least in part, on information generated by the bus adapter card, the information including at least one of cache statistics, locality information, and hotspot information. The program memory can be divided into a kernel space and a user space, with a kernel module in the kernel space, and a policy engine in the user space configured to send a policy to the kernel module to control the information provided by the kernel module. The policy sent to the kernel module can relate to at least one of a pre-fetch and quality of service policy.

According to another aspect of the described systems and techniques, a method includes receiving at a driver program, a request corresponding to a storage device connected with a bus adapter card and modifying a communication between the driver program and the bus adapter card responsive to information provided separate from the request, where the communication corresponds to the request.

These and other implementations can include one or more of the following features. The method can include determining that the request should be redirected to a kernel module in the computing apparatus and receiving at the driver from the kernel module, the information comprising a directive corresponding to the request. The determining can be based on at least one policy received from a policy engine, where the at least one policy is based in part on information generated by the bus adapter card, the information including at least one of cache statistics, locality information, and hotspot information. The directive can be associated with the request on a per request basis and can be operable to cause the bus adapter card to perform at least one of a pre-fetch and quality of service operation. The information can comprise a directive associated with the request and the directive can be based at least in part on at least one policy received from a policy engine, where the at least one policy is based in part on information generated by the bus adapter card, the information including at least one of cache statistics, locality information, and hotspot information. The directive can be associated with the request on a per LUN basis and can be operable to cause the bus adapter card to perform at least one of a pre-fetch and quality of service operation.

According to another aspect of the described systems and techniques, a non-transitory medium is configured to cause data processing apparatus to perform operations including receiving a request corresponding to a storage device connected with a bus adapter card, associating a directive with the request, the directive influencing a caching behavior of the bus adapter card, and communicating the directive to the bus adapter card to alter the caching behavior of the bus adapter card.

These and other implementations can include one or more of the following features. The request can be received by a host driver, the directive can be associated with the request by the host driver, and the directive can be communicated to the bus adapter card by the host driver. The request can be received by a kernel module from a host driver and the directive can be associated with the request by the kernel module. The directive associated with the request can be based at least in part on information generated by the bus adapter card, the information including at least one of cache statistics, locality information, and hotspot information. The directive associated with the request can be based, at least in part, on a policy received from a policy engine. The directive associated with the request can relate to at least one of a pre-fetch and quality of service operation.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiment(s) below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus (e.g., a minicomputer, a server, a mainframe, a supercomputer), or combinations of these.

The term "data processing apparatus" encompasses all kinds of apparatus, devices, and machines for processing data, including by way of example a programmable processor, a computer, a system on a chip, or multiple ones, or combinations of the foregoing. The apparatus can include special purpose logic circuitry, e.g., field programmable gate array (FPGA) or an application specific integrated circuit (ASIC).

The described systems and techniques can result in an enhanced ability to customize caching behavior of a bus adapter card while reducing firmware supportability issues. For example, by providing an Original Equipment Manufacturer (OEM) with the ability to peek into the Input/Output (I/O) requests going into a bus adapter card in a non-intrusive way, and allowing the OEM to associate well-defined directives with these I/O requests, alterations can be made to a caching behavior of the bus adapter card without requiring custom firmware for each alteration.

Another potential advantage can include customizing what data is stored in cache memory and how long that data is stored in the cache memory. For example, most databases typically have log volumes. Before any data is updated in storage for a database, a record is made into the log. Log volumes can see many more updates than the actual storage containing the database. Therefore, it may be beneficial to store the log volume in cache memory. However, cache memory is generally blind to what is going on beyond the cache and makes no decisions on what data to store and how long the data is stored in the cache. By providing tools to alter the behavior of the cache memory, a log volume for a database can be stored in the cache memory for a specific duration of time to assist the needs of the database.

Details of one or more implementations are set forth in the accompanying drawings and the description below. Other features, objects and advantages may be apparent from the description and drawings, and from the claims.

DRAWING DESCRIPTIONS

Like reference symbols in the various drawings indicate like elements.

DETAILED DESCRIPTION

Caching for storage systems (e.g., individual storage devices, such as hard drives, or combinations of storage devices) by leveraging small, but fast random access or solid-state (e.g., flash) memory has become especially popular. Based on the data requested by a host machine, other related data can be cached in anticipation that the host may request the other related data. The size of the cache memory, however, is limited. Accordingly, the amount of data that can be cached is also limited. Therefore, a cache controller can selectively delete data from the cache memory. For example, data not requested by the host for a period of time can be deleted from the cache memory. Data can also be deleted when the host requests data different from the data stored in the cache memory. By selectively deleting data from the cache memory, data that is more likely to be used by the host can be cached.

One example of a caching system is a bus adapter card. Many bus adapter cards cache a block of data based on a bus adapter card's pre-defined caching behavior. For example, a bus adapter card can provide block storage acceleration by dynamically caching frequently accessed data, caching data likely to be accessed in the near future, caching data based on a caching priority for the data, caching data for a longer duration than other cached data, deleting data from the cache not likely to be accessed in the near future, and the like. A user (e.g., an Original Equipment Manufacturer (OEM)), interested in using a bus adapter card may desire to customize the bus adapter card in order to alter a behavior of the cache, e.g., based on proprietary heuristics and the specific needs of an application. To customize pre-defined caching behavior of a bus adapter card, alterations can be made to the firmware of the bus adapter card by the card manufacture for a user. However, such alterations may require the bus adapter card manufacturer to alter the firmware for every customization request, thus potentially resulting in numerous supportability issues for the varying firmware versions.

To reduce the number of firmware versions for a bus adapter card and to reduce supportability issues, well-defined interfaces and the building blocks necessary for a complete customization solution can be provided to users. In this manner, customizations can be made to a bus adapter card in a way that suits the needs of a user without requiring alterations to the card's firmware for every customization request. For example, a user can be provided with the ability to peek into the input/output (I/O) requests going into a bus adapter card in a non-intrusive way and then be able to add well-defined directives to these I/O requests in order to alter a caching behavior of the bus adapter card per the user's requirements. Examples of such directives include pre-fetch and Quality of Service (QoS) operations on either a per-I/O request basis or on a per Logical Unit Number (LUN) basis.

Figure 1:
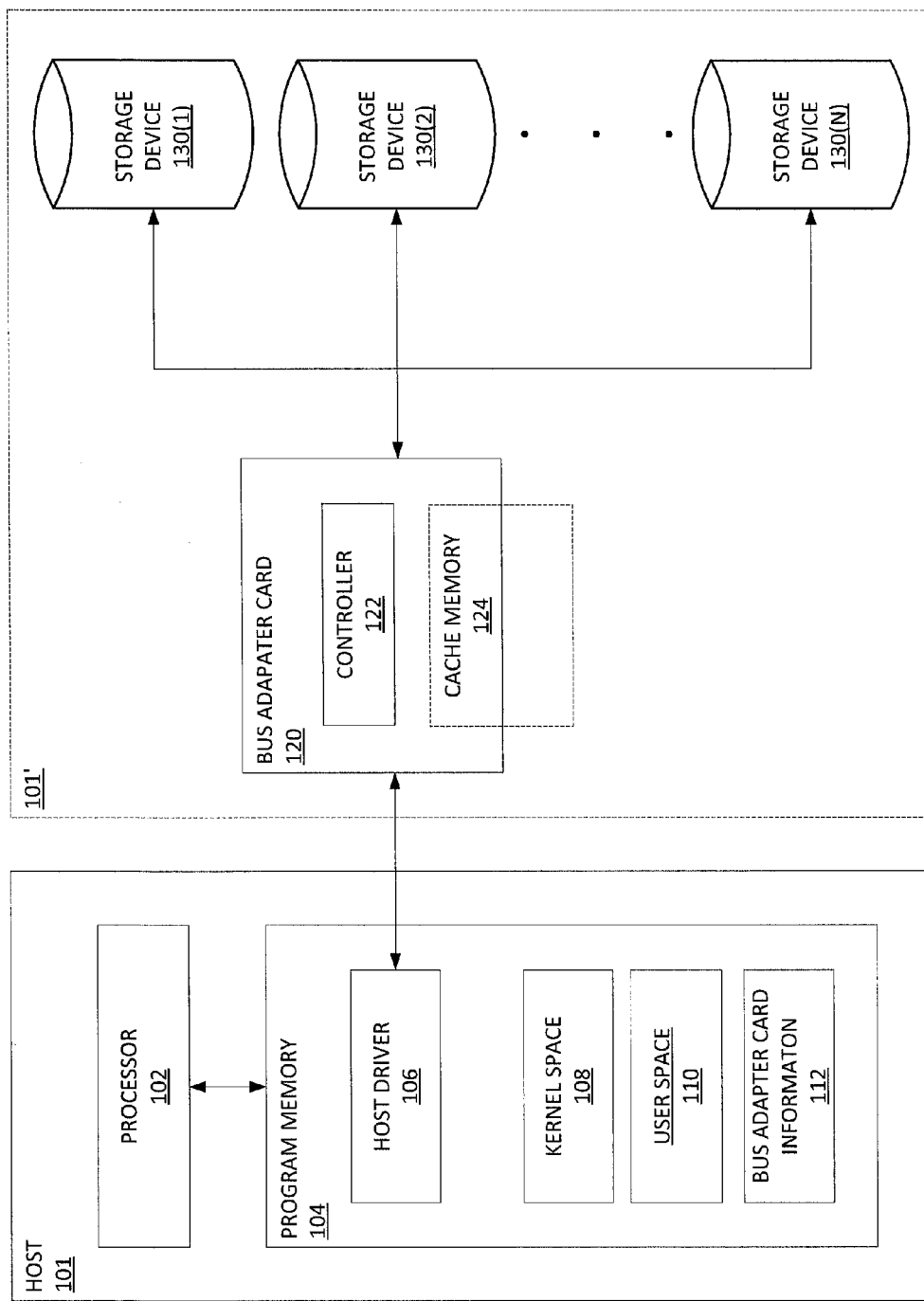
FIG. 1 is a block diagram showing aspects of an example of a system for caching data stored on one or more storage devices.

FIG. 1 is a block diagram showing aspects of an example of a system for caching data stored on one or more storage devices. For example, data from one or more storage devices 130(1)-130(N) (storage devices 130) can be cached in cache memory 124 in response to I/O requests for data from one or more of storage devices 130. Bus adapter card 120 can be communicatively coupled to storage devices 130. In addition, bus adapter card 120 can include cache memory 124 and/or be communicatively coupled to cache memory 124 external to bus adapter card 120. Bus adapter card 120 can include controller 122. Controller 122 can determine which data from storage devices 130 to cache in cache memory 124. Storage devices 130 can be individual storage devices (e.g., hard drives) as well as combinations of storage devices, e.g., Redundant Array of Independent Disks (RAID), Network Attached Storage (NAS), and Storage Area Network (SAN).

In some implementations, bus adapter card 120 is configured to interface with program memory 104 and/or processor 102 of host machine 101. For example, controller 122 can receive from program memory 104, e.g., from host driver 106, I/O requests for data from storage devices 130 and determine which data from storage devices 130 to cache in cache memory 124. Program memory 104 can also contain kernel space 108, user space 110, and bus adapter card information 112. In some implementations, kernel space 108 includes a kernel module capable of communicating with host driver 106 through well-defined application programmer interfaces (APIs). A kernel module in kernel space 108 can be used by a user, for example, to customize, influence, or alter the behavior of cache memory 124 on or up to a per-I/O requests basis. In some implementations, user space 110 can include a policy engine capable of pushing standing and dynamic policies to alter a caching behavior of bus adapter card 120. For example, a policy engine in user space 110 can communicate a standing directive to host driver 106 to never cache blocks of memory read from a certain LUN. In another example, a policy engine in user space 110 can communicate with a kernel module in kernel space 108 directing the kernel module to apply a certain quality of services (QoS) level for I/O requests that fall in a certain region of a specific LUN. Bus adapter card information 112 can include information about bus adapter card 120. For example, bus adapter card information 112 can include cache statistics, locality information, and/or hotspot information about cache memory 124.

In some implementations, bus adapter card 120 and storage devices 130 can be part of storage system 101'. Additionally, storage system 101' can be external to or part of host machine 101.

Figure 2:
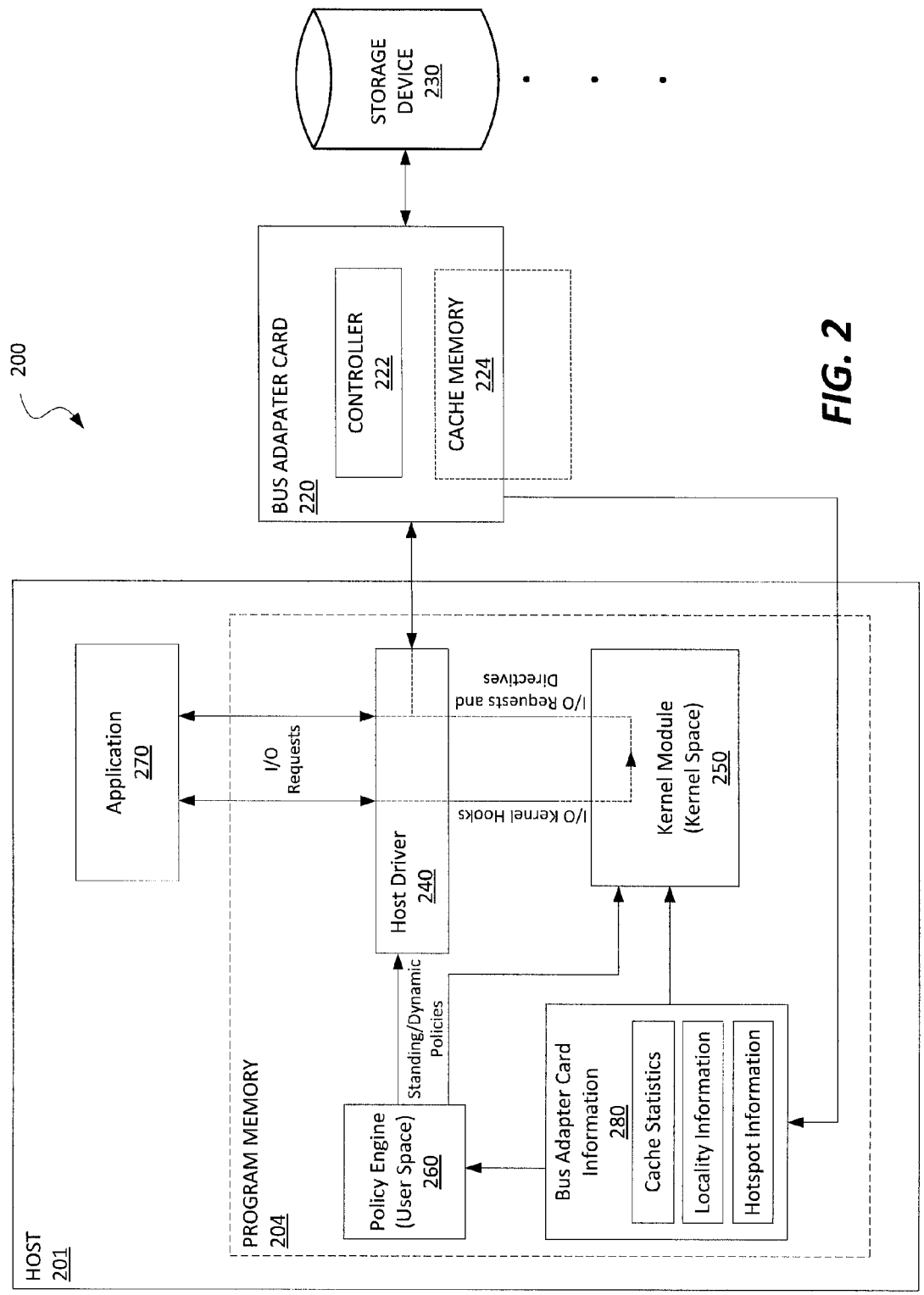
FIG. 2 is a block diagram showing aspects of an example of a system for altering the caching behavior of a bus adapter card.

FIG. 2 is a block diagram showing aspects of an example of a system 200 for altering the caching behavior of a bus adapter card 220. System 200 includes host machine 201, bus adapter card 220, and one or more of storage device 230. Host machine 201 can be, for example, any suitable computer system or machine running an operating system such as LINUX™, VMWARE™, WINDOWS™, and the like.

Bus adapter card 220 can provide block storage acceleration by dynamically caching data in cache memory 224. The data for which caching is performed on bus adapter card 220 can be made available by one or more of storage device 230 through direct connectivity with bus adapter card 220. Bus adapter card 220 can support multiple ways to connect to storage device 230. For example, bus adapter card 220 may be directly attached to storage device 230 (e.g., a hard-disk) or bus adapter card 220 may be connected to storage device 230 over a network (e.g., Internet Small Computer System Interface (iSCSI), Fibre Channel (FC), and Fibre Channel over Ethernet (FCoE)). Bus adapter card 220 can include a controller 222. Controller 222 can determine which data from storage device 230 to cache in cache memory 224.

Host machine 201 includes a host driver 240. Host driver 240 can present data from storage device 230 to host machine 201. For example, data from storage device 230 can be served by bus adapter card 220 to host driver 240 and then by host driver 240 to application 270 running on host device 201. In some implementations, host driver 240 can be a Small Computer System Interface (SCSI) host driver and can be connected to bus adapter card 220 through a PCIe interface. For example, bus adapter card 220 can be plugged into a PCIe socket on host machine 201. In some implementations, bus adapter card 220 can export devices, e.g., SCSI devices, to host driver 240. That is, bus adapter card 220 can act as an intermediary between storage device 230 and host driver 240. Host driver 240 can communicate with host machine 201 about devices connected to bus adapter card 220. For example, host driver 240 can communicate with an application 270 running on host machine 201. Utilizing host driver 240, application 270 can read and write data from and to storage device 230, for example, by communicating with host driver 240.

Users interested in using bus adapter card 220 may desire to customize particular aspects of the card's caching behavior. For example, a user may desire that bus adapter card 220 pre-fetch data from storage device 230 and store it in cache memory 224 for later use. Data acquired during a pre-fetch generally need not be immediately returned to a host machine. Another user may desire to employ a specific Quality of Service (QoS) metric to indicate certain characteristics expected from a cache memory. For example, a QoS metric can be specified for either an entire Logical Unit Number (LUN) or specific portions of a LUN and the metric can indicate, for example, whether to cache data, the priority with which to cache data, and/or the duration to cache data.

Utilizing kernel module 250 and/or policy engine 260, a user can customize a caching behavior of bus adapter card 220 to suit the individual needs of the user without requiring alterations to the firmware of bus adapter card 220 for every customization request. In addition, by not running user software on bus adapter card 220, customization of bus adapter card 220 can be minimally invasive while still providing the building blocks necessary for a complete customization solution.

In some implementations, a user can utilize the pre-defined caching functionality of bus adapter card 220 while customizing the caching behavior of bus adapter card 220 by using well-defined interfaces. For example, a user can "peek" into the I/O requests going into bus adapter card 220 in a non-intrusive way and add well-defined directives to these requests in order to alter a caching behavior of bus adapter card 220 per the user's requirements. The bus adapter card manufacturer may ultimately decide what customizable functionality to provide while providing a user with the capability to fine tune such functionality to suit the user's individual needs. Two examples of these customizations include pre-fetches and Quality of Service (QoS) operations on either a per I/O request basis or on a per Logical Unit Number (LUN) basis.

Host machine 201 includes kernel module 250. In some implementations, kernel module 250 can be a module in kernel space which communicates with host driver 240 through well-defined interfaces. A kernel space, for example, can be a space in a computer system acting as a bridge between applications and the actual data processing done at the hardware level. For example, kernel space can be reserved for running the kernel, or central component of most computer operating systems, kernel extensions, and most device drivers. Kernel module 250 can be used by a user to customize a caching behavior of bus adapter card 220 on or up to a single I/O request basis. For example, well-defined interfaces can be provided so that when an I/O request is received by host driver 240 from application 270, the I/O request is diverted to kernel module 250 by an I/O kernel hook. Custom directives can be associated with the diverted I/O request by kernel module 250 to alter a pre-defined caching behavior of bus adapter card 220. In some implementations, by associating directives with I/O requests, a user may instruct bus adapter card 220 to pre-fetch data based on the I/O requests coming into kernel module 250. When an I/O request is communicated to bus adapter card 220 with an added pre-fetch directive from kernel module 250, bus adapter card 220 can pre-fetch data from storage device 230 as indicated by the pre-fetch directive and store the pre-fetched data in cache memory 224.

Host machine 201 includes policy engine 260. In some implementations policy engine 260 can be a module in user space which communicates with host driver 240 and kernel module 250. A user space may consist of, for example, a memory area where all user mode applications work and where the memory can be swapped out when necessary, generally without modifications to the kernel space. Policy engine 260 can push standing or dynamic policies to either host driver 240 or kernel module 250 to alter a caching behavior of bus adapter card 220. For example, a user may desire better throughput for a certain storage device versus another storage device. By instructing bus adapter card 220 to store data in cache memory 224 longer for certain I/O requests to a storage device, the desired throughput for the storage device may be achieved.

In some implementations, policy engine 260 can issue policies to host driver 240. For example, policy engine 260 can communicate a policy to host driver 240 instructing host driver 240 to communicate directives to bus adapter card 220 directing bus adapter card 220 to never cache blocks read from a certain LUN, cache blocks with a normal priority, keep blocks in cache longer, pin blocks to cache permanently, expire blocks from cache after 30 minutes, and the like. Policy engine 260 can also issue policies to kernel module 250. For example, policy engine 260 can direct kernel module 250 to apply certain QoS levels for I/O requests that fall in a certain logical block address (LBA) region of a specific LUN (e.g., LBA x-LBA y of a specific LUN).

In some implementations, an I/O request need not be received by host driver 240 or kernel module 250 to issue directives to bus adapter card 220. For example, policy engine 260 can communicate a standing pre-fetch policy to kernel module 250. Based on the standing pre-fetch policy, kernel module 250 can then relay the pre-fetch directive to bus adapter card 220 with or without an I/O request.

Bus adapter card information 280 can be communicated to kernel module 250 and policy engine 260. Bus adapter card information 280 can include information about the caching characteristics of cache memory 224. For example, bus adapter card information 280 can include cache statistics, locality information, hotspot information, and the like. Bus adapter card information 280 can be pieces of useful information that can be generated by bus adapter card 220 and exported to host machine 201. Users can make use of information 280 for help with writing meaningful heuristics to alter a caching behavior of bus adapter card 220.

A hotspot on a storage device refers to a region of the storage device that is accessed at a higher rate than other regions over a particular time period, where an access to a region of a storage device may include a read operation or a write operation performed on the region and a region of a storage device may be a contiguous portion or subsection of the storage device that is separately monitored for determining the existence of a hotspot. Hotspots are further described in U.S. patent application Ser. No. 12/881,459, filed Sep. 14, 2010, issued as U.S. Pat. No. 8,473,680, and titled "Hotspot Detection and Caching for Storage Devices."

Locality information can include both temporal locality information and spatial locality information. Temporal locality information refers to a number of addresses on a storage system that are referenced per unit time, or equivalently the temporal locality represents a rate of references to addresses on the storage system. Moreover, the temporal locality can be monitored for the storage system, or for one or more regions on the storage system, and a caching algorithm can be implemented based on the monitored rate of references to address on the storage system.

Spatial locality information refers to a number of addresses on the storage system that are referenced per unit address space, or equivalently the spatial locality represents a spatial-density of references to address on the storage system. For example, when a particular address of the storage system is referenced, the spatial locality provides the probability that nearby memory locations will be references in the future. Locality information is further described in U.S. patent application Ser. No. 13/033,569, filed Feb. 23, 2011, published as U.S. Pub. No. 2011/0208919, and titled "Caching Based on Spatial Distribution of Accesses to Data Storage Devices."

Figure 3:
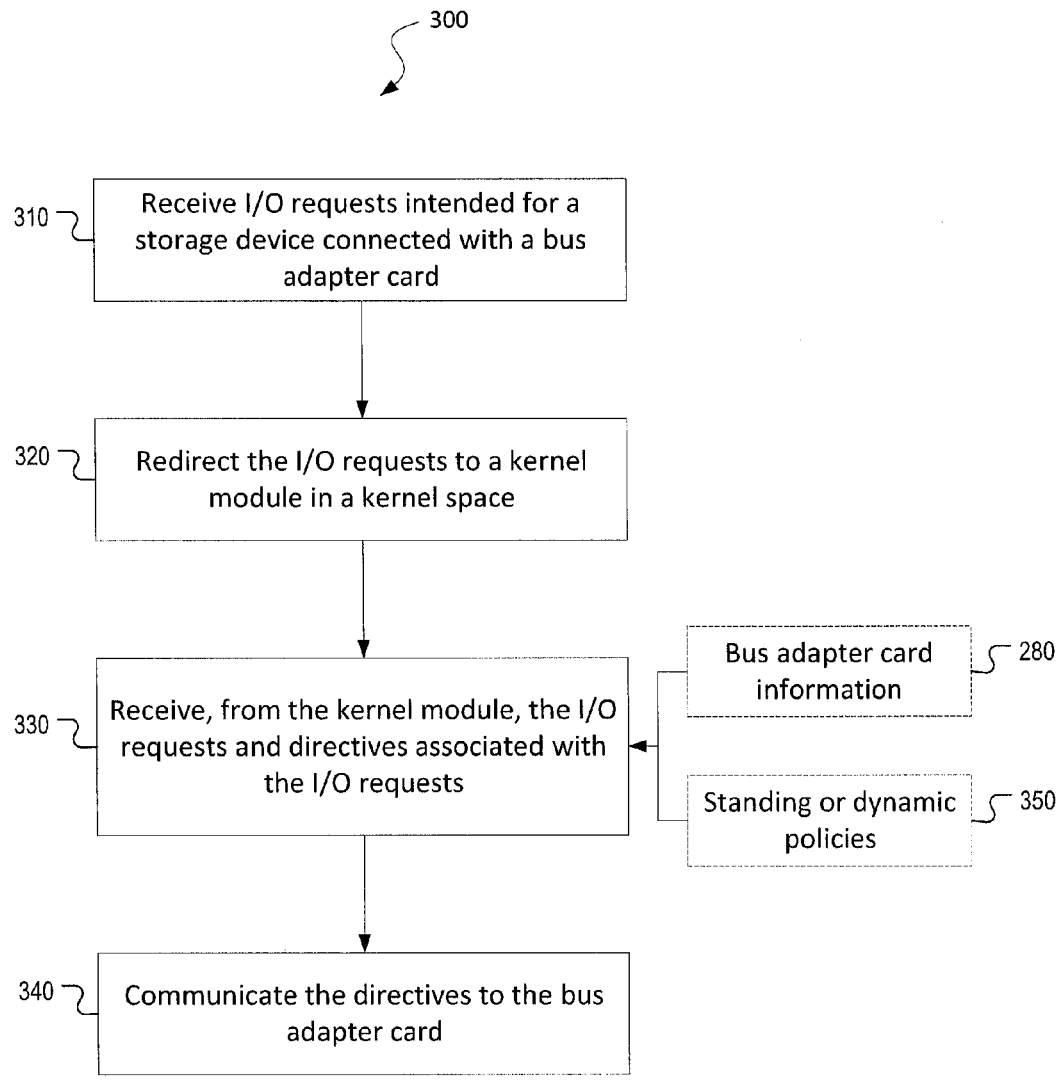
FIG. 3 shows an example of a method for customizing a bus adapter card based on I/O requests.

FIG. 3 shows an example of a method 300 for customizing a bus adapter card based on I/O requests. At 310, I/O requests intended for a storage device connected with a bus adapter card are received. For example, I/O requests intended for storage device 230 can be received by host driver 240 from application 270. At 320, the I/O requests can be redirected to a kernel module in a kernel space of program memory. For example, the I/O requests can be redirected by host driver 240 to kernel module 250. At 330, the I/O requests and directives associated with the I/O requests can be received. For example, the I/O requests and directives associated with the I/O requests can be received by host driver 240 from kernel module 250. The received directives can be configured to alter a caching behavior of a bus adapter card (e.g., bus adapter card 220). For example, the received directives can be configured to direct whether a bus adapter card will cache frequently accessed data, cache data likely to be accessed in the near future, cache data based on a caching priority for the data, cache data for a longer duration than other than other cached data, delete data from the cache not likely to be accessed in the near future, and the like. In some implementations, the received directives can be based, at least in part, on bus adapter card information 280 and/or standing or dynamic policies 350 (e.g., standing or dynamic policies from policy engine 260). At 340, the directives can be communicated to the bus adapter card. In some implementations, after host driver 240 receives the redirected I/O requests and directives from kernel module 250, host driver 240 can communicate the I/O requests and the directives to bus adapter card 220. In other implementations, at 340, host driver 240 can modify the I/O requests according to the associated directives and communicate the modified I/O requests to bus adapter card 220.

Figure 4:
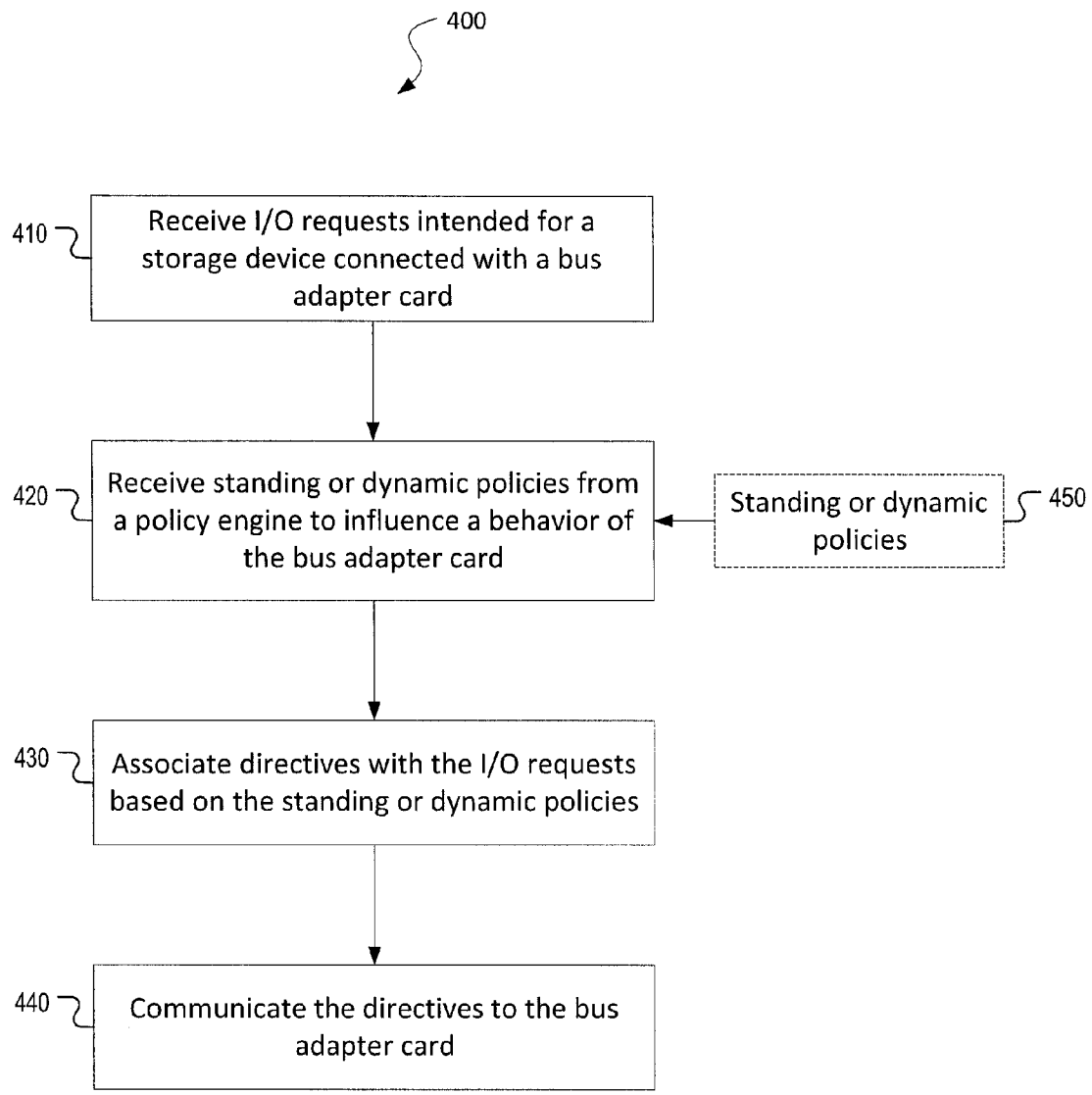
FIG. 4 shows an example of a method for customizing a bus adapter card based on standing or dynamic policies.

FIG. 4 shows an example of a method 400 for customizing a bus adapter card based on standing or dynamic policies. At 410, I/O requests intended for storage device 230 can be received by host driver 240 from application 270. At 420, standing and/or dynamic policies can be received from a policy engine to influence a behavior of the bus adapter card. For example, standing or dynamic policies 450 can be received by host driver 240 from policy engine 260. At 430, directives based on the standing or dynamic policies can be associated with the I/O requests. The directives may be capable of influencing a caching behavior of the bus adapter card. For example, the directives may be configured to influence whether the bus adapter card will cache frequently accessed data, cache data likely to be accessed in the near future, cache data based on a caching priority for the data, cache data for a longer duration than other than other cached data, delete data from the cache not likely to be accessed in the near future, and the like. At 440, the directives can be communicated to the bus adapter card. In some implementations, after host driver 240 receives the standing or dynamic policies and directives are associated with the I/O requests based on the policies, host driver 240 can communicate the I/O requests and the directives to bus adapter card 220. In other implementations, at 440, host driver 240 can modify the I/O requests according to the associated directives and communicate the modified I/O requests to bus adapter card 220.

Figure 5:
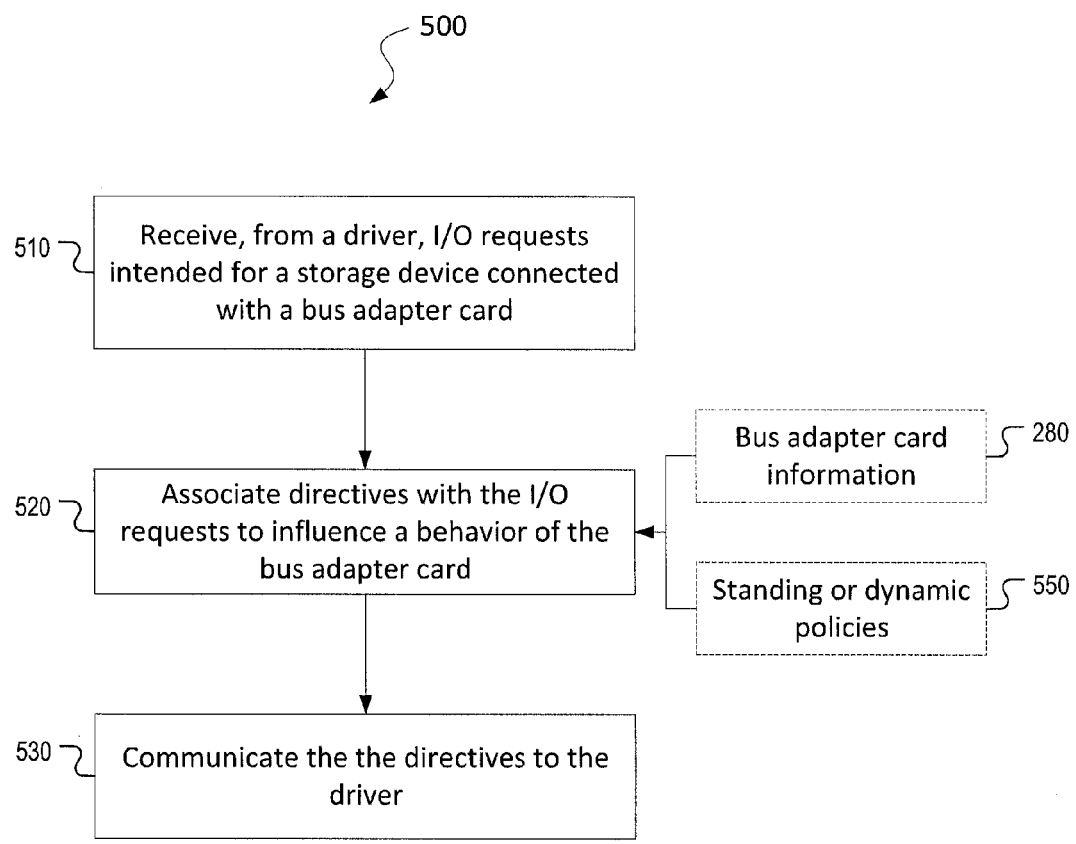
FIG. 5 shows an example of a method for associating directives with I/O requests.

FIG. 5 shows an example of a method 500 for associating directives with I/O requests. At 510, I/O requests intended for a storage device connected with a bus adapter card can be received. For example, I/O requests intended for storage device 230 connected with bus adapter card 220 can be received by kernel module 250 from host driver 240. At 520, directives can be associated with the I/O requests to influence a behavior of the bus adapter card. For example, the directives my influence whether the bus adapter card will cache frequently accessed data, cache data likely to be accessed in the near future, cache data based on a caching priority for the data, cache data for a longer duration than other than other cached data, delete data from the cache not likely to be accessed in the near future, and the like. In some implementations, the received directives can be based, at least in part, on bus adapter card information 280 and/or standing or dynamic policies 550 (e.g., standing or dynamic policies from policy engine 260). At 530, the I/O requests and the directives can be communicated to the driver. For example, the I/O requests and the directives can be communicated from kernel module 250 to host driver 240.

Figure 6:
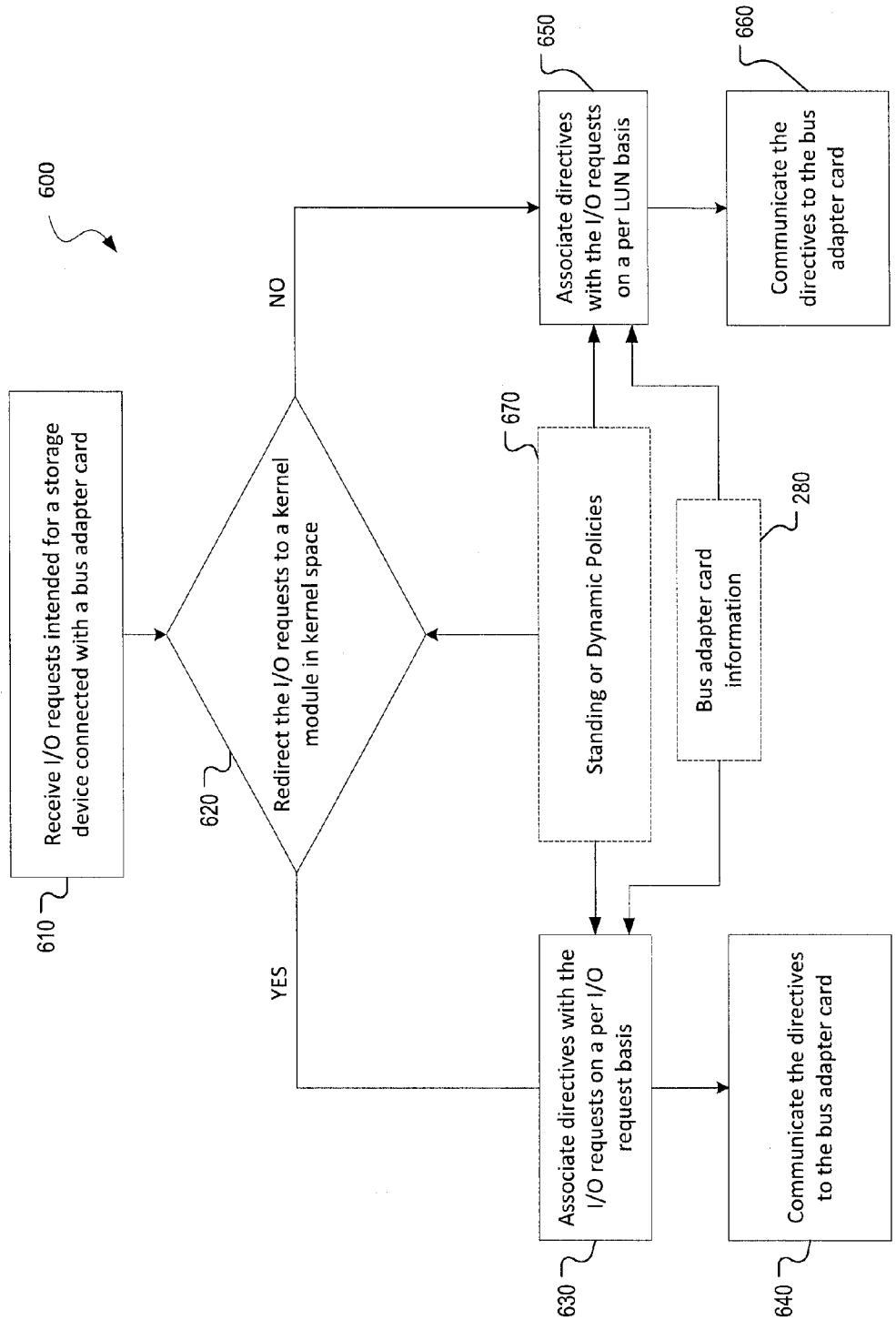
FIG. 6 shows an example of a method for customizing a bus adapter card on a per I/O request basis and/or based on standing or dynamic policies.

FIG. 6 shows an example of a method 600 for customizing a bus adapter card on a per I/O request basis and/or based on standing or dynamic policies. At 610, I/O requests intended for a storage device (e.g., storage device 230) connected to a bus adapter card (e.g., bus adapter card 220) can be received by a host driver (e.g., host driver 240). In some implementations, the I/O requests can be sent from an application (e.g., application 270) running on a host machine (e.g., host machine 201) and can be intended for a storage device connected with the host machine (e.g., a storage device 230).

At 620, a determination can be made about how to process the I/O requests received at 610. In some implementations, upon reception of I/O requests, a host driver (e.g., host driver 240) can decide at 620 to redirect the I/O requests to a kernel module in kernel space. For example, host driver 240 can be configured to redirect the I/O requests on a per-I/O request basis to kernel module 250 for further processing. At 620, the received I/O requests can be diverted to a kernel module in kernel space on a per-I/O request basis providing for the opportunity to add directives at a finer level of granularity to the I/O requests. At 630, directives can be associated with the redirected I/O requests to customize or influence the behavior of a bus adapter card. For example, kernel module 250 can receive the I/O requests and determine that a pre-fetch of certain data should be initiated based on a specific I/O request. In some implementations, directives can be associated based on standing or dynamic policies 670 (e.g., policies from policy engine 260) and/or bus adapter card information 280. For example, a policy from policy engine 260 may instruct kernel module 250 to associate directives with the I/O requests to employ a QoS level for specific I/O requests that fall in a certain logical block address region of a specific logical unit number. At 640, the directives can be communicated to a bus adapter card. For example, the I/O requests and directives can be communicated back to the host driver 240 and forwarded by the host driver to bus adapter card 220. In some implementations, host driver 240 communicates the directives along with the I/O requests to bus adapter card 220. In other implementations, at 640, host driver 240 can modify the I/O requests according to the associated directives and communicate the modified I/O requests to bus adapter card 220.

In some implementations at 620, host driver 240 can determine not to redirect the I/O requests to kernel module 250 based on standing or dynamic policies 670 not to redirect the I/O requests (e.g., policies received from policy engine 260). For example, at 650, after determining not to redirect the I/O requests to kernel module 250, host driver 240 can associate directives with the I/O request. Host driver may associate directives with the I/O requests on a per LUN basis based on standing or dynamic policies 670 (e.g., policies received from policy engine 260) and/or bus adapter card information 280. For example, host driver 240 can determine that the data associated with the I/O requests should never be cached by bus adapter card 220 because there is a standing policy to never cache data from the LUN associated with the I/O request. In that case, the host driver can communicate at 660 the I/O requests to the bus adapter card along with a directive directing the bus adapter card not to cache the data associated with the I/O requests. Other policies may instruct the host driver to communicate a directive to the bus adapter card to cache the data corresponding to the I/O requests with normal priority, to keep the data in the cache memory longer, to pin the data to the cache permanently, to delete the data from the cache memory after 30 minutes, etc. In some implementations, host driver 240 communicates the directives along with the I/O requests to bus adapter card 220. In other implementations, at 660, host driver 240 can modify the I/O requests according to the associated directives and communicate the modified I/O requests to bus adapter card 220.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A system comprising:
a computing apparatus comprising a processor and a program memory; and
a bus adapter card coupled with the computing apparatus and configured to connect with a storage device, the bus adapter card comprising a cache memory and a controller to cache in the cache memory data associated with the storage device;
wherein the program memory includes a driver to communicate with the bus adapter card responsive to requests corresponding to the storage device; and
the driver is configured to modify its communications with the bus adapter card responsive to information provided separate from the requests, the information comprising a directive associated with at least one request corresponding to the storage device, and the driver is configured to communicate the directive associated with the at least one request to the bus adapter card to alter a caching behavior of the bus adapter card.

2. The system of claim 1, wherein the program memory is divided into a kernel space and a user space, the system further comprising a kernel module in the kernel space, and the driver is configured to redirect the at least one request corresponding to the storage device over to the kernel module and receive from the kernel module the information comprising the directive associated with the at least one request.

3. The system of claim 2, wherein the directive associated with the at least one request is based on information generated by the bus adapter card, the information generated by the bus adapter card including at least one of cache statistics, locality information, and hotspot information.

4. The system of claim 2, wherein the directive associated with the at least one request directs the bus adapter card to perform at least one of a pre-fetch and quality of service operation.

5. The system of claim 1, wherein the program memory is divided into a kernel space and a user space, the system further comprising a policy engine in the user space, and the driver is configured to receive from the policy engine the information comprising a policy to modify a caching behavior of the bus adapter card.

6. The system of claim 5, wherein the information comprising a policy is based, at least in part, on information generated by the bus adapter card, the information including at least one of cache statistics, locality information, and hotspot information.

7. The system of claim 1, wherein the program memory is divided into a kernel space and a user space, the system further comprising a kernel module in the kernel space, and a policy engine in the user space configured to send a policy to the kernel module to control the information provided by the kernel module.

8. The system of claim 7, wherein the policy sent to the kernel module relates to at least one of a pre-fetch and quality of service policy.

9. A method comprising:
receiving at a driver program, a request corresponding to a storage device connected with a bus adapter card; and
modifying a communication between the driver program and the bus adapter card responsive to information provided separate from the request;
wherein the communication corresponds to the request, the information comprises a directive associated with the request, and modifying the communication comprises communicating the directive associated with the request to the bus adapter card to alter a caching behavior of the bus adapter card.

10. The method of claim 9, further comprising:
determining that the request should be redirected to a kernel module in the computing apparatus; and
receiving at the driver from the kernel module, the information comprising the directive corresponding to the request.

11. The method of claim 10, wherein the determining is based on at least one policy received from a policy engine, wherein the at least one policy is based in part on information generated by the bus adapter card, the information including at least one of cache statistics, locality information, and hotspot information.

12. The method of claim 10, wherein the directive is associated with the request on a per request basis and is operable to cause the bus adapter card to perform at least one of a pre-fetch and quality of service operation.

13. The method of claim 9, wherein the directive is based at least in part on at least one policy received from a policy engine, wherein the at least one policy is based in part on information generated by the bus adapter card, the information generated by the bus adapter card including at least one of cache statistics, locality information, and hotspot information.

14. The method of claim 13, wherein the directive is associated with the request on a per LUN basis and is operable to cause the bus adapter card to perform at least one of a pre-fetch and quality of service operation.

15. A non-transitory medium configured to cause data processing apparatus to perform operations comprising:
receiving a request corresponding to a storage device connected with a bus adapter card;
associating a directive with the request, the directive influencing a caching behavior of the bus adapter card; and
communicating the directive to the bus adapter card to alter the caching behavior of the bus adapter card.

16. The medium of claim 15, wherein the request is received by a host driver, the directive is associated with the request by the host driver, and the directive is communicated to the bus adapter card by the host driver.

17. The medium of claim 15, wherein the request is received by a kernel module from a host driver and the directive is associated with the request by the kernel module.

18. The medium of claim 15, wherein the directive associated with the request is based at least in part on information generated by the bus adapter card, the information including at least one of cache statistics, locality information, and hotspot information.

19. The medium of claim 15, wherein the directive associated with the request is based, at least in part, on a policy received from a policy engine.

20. The medium of claim 15, wherein the directive associated with the request relates to at least one of a pre-fetch and quality of service operation.

* * * * *